Aug. 28, 1928.

E. C. HUTCHINSON 1,682,339

ADJUSTABLE SEAL RING

Filed July 1, 1924  2 Sheets-Sheet 1

Aug. 28, 1928.
E. C. HUTCHINSON
ADJUSTABLE SEAL RING
Filed July 1, 1924
1,682,339
2 Sheets-Sheet 2
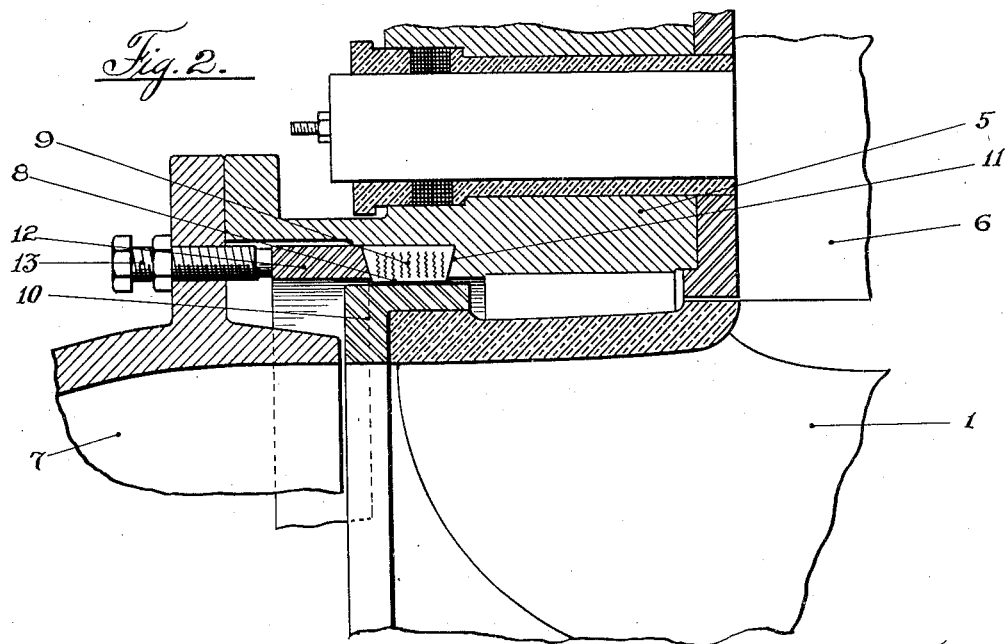
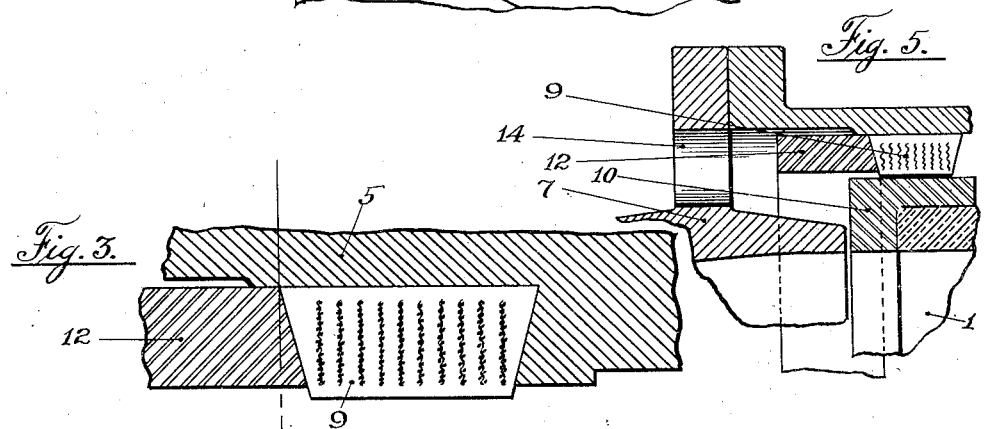
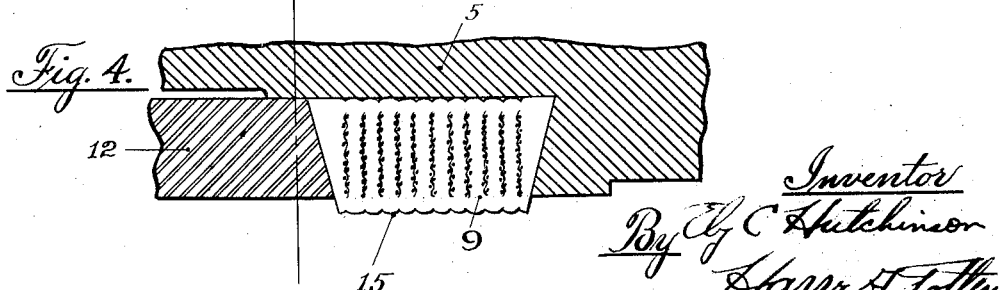

Patented Aug. 28, 1928.

1,682,339

UNITED STATES PATENT OFFICE.

ELY C. HUTCHINSON, OF OAKLAND, CALIFORNIA, ASSIGNOR TO THE PELTON WATER WHEEL CO., OF SAN FRANCISCO, CALIFORNIA, A CORPORATION OF CALIFORNIA.

ADJUSTABLE SEAL RING.

Application filed July 1, 1924. Serial No. 723,546.

This invention relates to an improved apparatus for preventing leakage through the sealing rings of hydraulic turbines and to that type of apparatus set forth in my co-pending application Serial Number 723,547, filed July 1, 1924.

The practice in the past has been to reduce the leakage between the rotating turbine runner and the stationary portions of the casing surrounding the same, as much as is consistent with economical and safe operation. Whatever this space may be, some water leaks through, this leakage substracted from the water passing through the runner represents a distinct loss of power.

There is a practical limit, however, to the reduction of the clearance spaces that may be established between the moving and stationary faces. If the turbine parts are all of metallic construction, and the clearance is so small that the faces almost touch, or are likely to touch through vibration or slight wear of the bearings of the rotor element, a slight friction would be developed that would in time destroy the sealing faces of the sealing rings, if not ultimately wreck the entire machine.

Under the lower effective heads of water pressures under which turbines have been accustomed to operate in the past, it has been the practice to keep the spaces between the stationary and moving parts of the turbine runner and turbine casing quite large in order to prevent possibility of rubbing contact and the danger consequent thereto.

With the advent of the operation of turbines under higher heads of water pressure, the resultant loss of power due to leakage through large clearance spaces has made necessary a construction that would reduce the clearance between the faces of the rotary and stationary parts to a minimum, and in some cases to a point where there is almost actual rubbing contact.

This practice has developed many cases, where, by reason of the high speed due to the increased head pressures, or to a large diameter of the turbine runner, the sealing surfaces of the runner will be moving past the stationary sealing surfaces of the casing at a very high velocity, which places certain limitations upon the clearances with which it is practical to operate the turbine. For this reason it has seemed necessary to still leave, comparatively, quite large clearance spaces between the runner and the stationary parts.

Manufacturers of large size units where the turbines are directly connected to an energy absorber, have found it expedient and desirable to thoroughly test the apparatus after shipping or installation, by giving them actual operative tests as well as efficiency tests to determine certain factors of engineering practice, by bringing the turbines with their generators to which they are directly connected, up to a full speed of operation under a sufficient pressure, and then shut off the water completely.

In this manner it is possible to observe the windage and frictional characteristics of the unit during the period of time in which the rotating portions return from full speed to a state of rest. At such times as the water is shut off from the turbine, the runner is required to rotate within the close clearances without the cooling or partial internal lubricating effect existing when the turbine is generating power and is receiving the water supply required therefor.

It is easily understood that as the clearance spaces are reduced the lubricating effect of the leaking water is also reduced, until the clearances will become so small that very little if any water will leak through and consequently very little if any internal lubrication will exist.

To overcome the difficulties in the operation of turbines as I have described, and to provide an efficient and practical method of eliminating the dangers and possible destruction of the turbines resulting from the causes mentioned, I have devised an improved means of sealing and reducing the clearance spaces as illustrated and described herein.

It is a principal object of my present invention to provide one element, at least, of the sealing joint between the turbine runner and the fixed portion of the turbine, of a compressible material accompanied with suitable adjusting mechanism whereby the compressible element may be nicely controlled and manipulated to reduce the running clearance to the absolute minimum, and if desirable, to have actual rubbing contact without the necessity of supplying any lubricating material other than the slight lubricating effect imparted by the fluid used to operate the turbine.

Another object of the invention is to provide external manipulative means for adjusting the compressible element, together with port holes in the casing to give visual evidence of the extent or necessity of adjustment and to enable the insertion of measuring devices into the clearance spaces for accurately determining the exact setting obtained when the adjusting means are manipulated.

Another object of the invention resides in so mounting the compressible sealing element that adjustment for reducing the clearance spaces will cause displacement of the compressible element in substantially one direction only.

Another object of the invention resides in so constructing the compressible element that it is restrained from free distortion under compression but is, instead controlled and guided in its displacement principally in a radial direction which will materially assist in reducing the clearance spaces in the running joints and more effectively act as a seal to prevent the leakage of propellant fluid when operating at or under the higher heads of fluid pressure.

Another and very important object of the invention resides in providing a compressible or plastic sealing element of a material that will not create excessive or destructive friction, if, through ordinary wear of operation the turbine runner should acquire a little vibration or assume rotative positions slightly out of true concentricity with the normal position of operation and thus bring about actual rubbing contact with a portion of the compressible sealing element.

Another object of the invention resides in having means available for adjusting the compressible or plastic sealing element more on one side of the turbine runner than the other to compensate and accommodate any conditions of operation that may result from a changed center of rotation due to wear or other causes not easily remediable except by a complete overhauling of the turbine, and thus keep the turbine in effective operation under conditions that would be well nigh intolerable with the ordinary sealing elements now in general use.

With such objects in view as well as other advantages inherent in the invention, the novel structural peculiarities, novel organization of elements, and the separate and collective operations involved in carrying out the recited objects of my invention, which will be made the subject matter of claims hereto appended, I wish it to be understood that the several necessary elements and combinations constituting the same may be varied in their proportions, placement and general arrangement without departing from the scope and nature of my invention.

In carrying out the objects of my invention in a concrete form of machine, further objects, advantages and improvements have been evolved than have been recited, and in order to make the invention more clearly understood there are shown, somewhat diagrammatically, in the accompanying drawings means and mechanism embodying the preferred structural arrangement and the preferred disposition of the different parts and combinations, without limiting the claims to the details of construction shown, in which I have simply illustrated one way of embodying the creative part or conception of the invention in a concrete form of machine. The described devices are simply embodiments of the invention which other structures might also employ and some of the parts or combination of parts may be used without the others in different types of such machines without departure from the purview of my invention and I regard myself as entitled to such variation from the shown and described devices as fall within the scope and meaning of the claims hereto appended.

Reference now being had to the drawings wherein—

Fig. 1 presents a vertical sectional elevation of a turbine equipped with my improved apparatus for reducing and maintaining a predetermined clearance space between the running joints of turbines and like machines. The turbine in all of its details is not shown but only such parts as seemed desirable to properly illustrate the application of my invention. On account of the smallness of the parts in a view of this kind the apparatus is not as effectively shown in this view as in the larger details following.

Fig. 2 is an enlarged detail of that part of the turbine and my improved apparatus lying approximately within the area of the circular dotted line of Fig. 1. In this view the various parts are in substantially the same relative positions as in Fig. 1 but owing to the increased scale they are shown clear and distinct. In this view the compressible element is shown in white with only the wiggle lines denoting the inserts for controlling the displacement of the material when compression is applied. Section lines have been omitted intentionally to more clearly show this element.

Fig. 3 shows a view of the compressible element drawn on a still larger scale with the immediate parts in the view in the same relative positions as Fig. 2 and is a companion view to Fig. 4. In this view the fabric inserts imbedded in the compressible element are clearly shown.

Fig. 4 is a companion view to Fig. 3 and is intended to illustrate just how the compressible material constituting the plastic element is controlled in its distortion movement when pressure is applied, and illustrates the approximate shape of the sealing face under these conditions.

Figure 1:
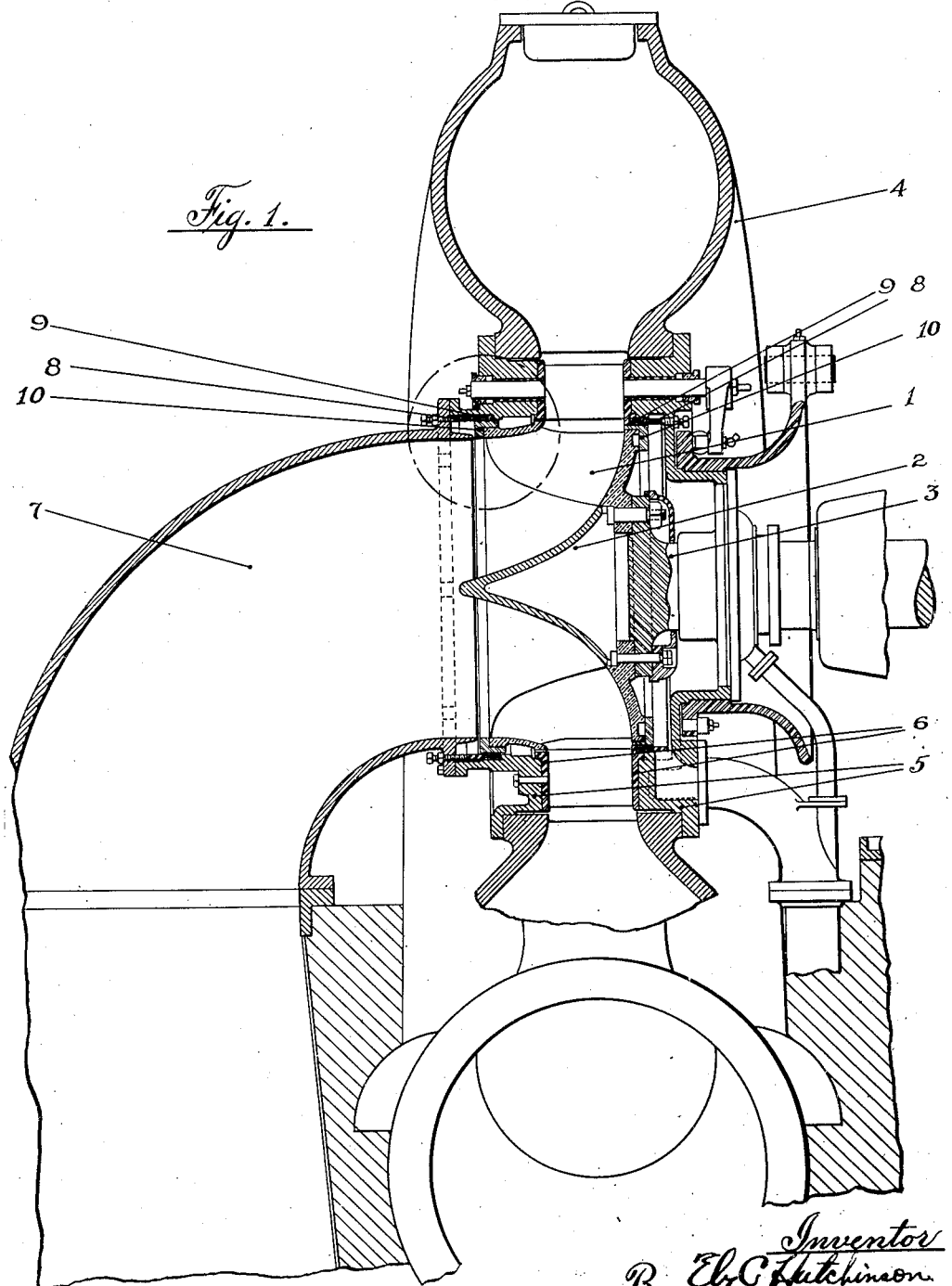

Fig. 5 is a detail view intended to illustrate one of the several port holes distributed around the flange of the outlet conduit and around the inner casing to enable the operator when adjusting the clearance spaces to have visual observation of his work and to determine by suitable measuring devices exactly the clearance obtained. This view is taken on a radial line passing through one of these port holes and may be anywhere around the circumference of the flange of the outlet conduit.

In the drawings like figures of reference indicate like parts on the several views.

A turbine such as I have shown to illustrate the application of my invention comprises a turbine runner 1, a diverting cone 2, secured together and mounted on the shaft 3 to form a complete rotating element of the turbine. The other end of the shaft 3 may be directly or otherwise connected to an electrical generator or other energy absorber.

The turbine runner is housed in a casing comprising the spiral portion 4 and the casing covers 5, to which are attached the throat or distributor plates 6, while the discharge from the runner is carried by the draft tube 7.

The outer surfaces of the turbine runner 1 and the inner surfaces of the casing covers 5 form sealing and running joints 8, these being the joints wherein the clearance spaces are desired as small as possible to prevent leakage.

Where the rotating and stationary parts forming these sealing joints have been made of metal the manufacturers and operators have endeavored to control the amount of waste water passing through these joints by adjusting said parts as closely as was practical, but they are necessarily held to certain limitations on account of the dangers attendant a too close adjustment which might permit frictional contact between the parts and subsequent damage or complete destruction of the unit. On account of these limitations and dangers larger clearances have been made than was desirable as it was more economical to lose the water than to lose the entire unit through destructive action.

My present invention disclosed herein completely overcomes these difficulties and removes all possible danger of destructive action through rubbing contact of the parts forming the running joints.

This improvement contemplates making one of the joint elements of a plastic or compressible material and so mounting it to form one side of the running joint that it may be compressed and the displacement of compression so controlled that the clearance in the joint may be made as small as is desired up to actual rubbing contact. In the drawings I have shown this compressible element as the outside or stationary element as lending itself more easily to manipulation in this position, and in this instance I have selected rubber as the material from which to form this element. In using the term rubber, I intend it to include any and all compounds containing rubber in such quantity that will make a compressible or plastic material suitable for this purpose.

This compressible joint element is designated on the drawings by the numeral 9, and the companion element of metal mounted on the runner is designated by the numeral 10, this element 10 is of course fixed and non-adjustable. The element 9 is much better shown in Fig. 2 which may now be referred to in the balance of the description immediately following.

I have shown the element 9 as of slightly wedge shape as probably being better adapted for the purpose than if the sides were straight, but the exact shape is more or less optional, for with the displacement controlling devices I have provided, almost any shape of element will work satisfactorily.

The inner edge of the compressible element 9 is abutted against a suitable shoulder 11 of the casing member 6 and has radial abutment against a seat of the same element 6, which locates it relative to the moving element 10. An adjustable gland ring 12 abuts against the side opposite the shoulder 11 and thus confines the compressible element 9 in a fixed location. Adjusting screws 13 arranged in properly spaced relation, circumferentially around the draft tube 7 provides highly efficient means for giving the gland ring 12 minute and accurate adjustment which in turn imparts just the desired compression to the plastic element 9 to cause the displacement necessary to reduce the clearance space between the elements 9 and 10 the amount desired.

A very important and highly desirable feature of this means of adjusting the compressible element resides in the fact that the adjustment may take place while the turbine is in full and complete operation. If clearance happens to be excessive at any time it may be quite easily detected by visual observation through the port holes 14, Fig. 5, and since the adjusting screws 13 may all be made of the same length within small limits, they may be each turned an equal amount and thus compress the element 9 uniformly over the entire circumference and the leakage reduced or completely eliminated as may be desired.

On account of the compressible element 9 being rigidly supported on three sides against metallic surfaces, when the gland ring 12 is adjusted the distortion due to compression will all be in a radial direction toward the center of the turbine runner. This movement of the element 9 will tend to close up the intervening space between its inner face and the outer face of the element 10 thus reducing the running clearance between these faces.

In order to control the extent of the distortion and distribute it uniformly over the mating surface of the element 9 I propose inserting a fabric insertion in the body of the element 9 while it is being moulded and to have these fabric insertions lie in a radial plane relative to the turbine runner so that when the element is compressed by means of the gland ring 12 its mating surface will assume a shape approximately as is shown at 15, Fig. 4. Without the fabric insertions the surface of the element 9 that is unsupported would bulge in a more or less uniform curve which would be highest near the center. By controlling the displacement as shown a series of small uniform bulges will be produced that will lie more or less parallel with the mating surface of the element 10.

The manner of constructing this compressible element forms the subject matter of a companion application and need not be further referred to here.

Figs. 3 and 4 are companion views and are intended to show the relative movement of the compressible element 9 when the gland ring 12 is adjusted and the manner in which the mating surface of the element 9 will form in a series of little bulges that will lie approximately parallel with the mating surface of the element 10 and much more effectively act as a seal against the passage of propellant fluid than would one large bulge that would act as a seal only at or near the center of the large bulge.

By reference to Fig. 5 it will be clearly seen how the port holes 14 will permit visual observation of the condition of the sealing element 9 and 10 and how easily a proper measuring instrument may be inserted to ascertain the exact amount of space existing at any time between the mating faces of the running joint and how easy it will be for an operator to observe and watch the effect of the adjustment while the turbine is in operation. If through visual observation it is seen that leakage is occurring at one side of the turbine and not on the other the gland ring 10 may be adjusted at the leaking areas without adjusting at any other points and by being able to do this with the turbine under full load the greatest efficiency of operation may be realized, a result that has never been before utilized under running conditions.

While I have shown my invention as applied to a single discharge turbine I wish to state that it is equally applicable to a turbine of a double discharge type as well as to all other types or kinds of machinery employing running joints. My invention applied to all such running joints will produce the same desirable results as I have mentioned in connection with water turbines.

I claim:—

1. A turbine or like machine having relatively moving and stationary parts and sealing elements with closely adjacent surfaces forming running joints between said moving and stationary parts, one of said sealing elements characterized by having a relatively smooth sealing face when not under compression and further characterized by having embedded inserts falling short of intersecting its sealing face to control its movement under compression, and means for acting on said sealing element at substantially right angles to its sealing face whereby its normally smooth running joint forming surface is distorted to provide a plurality of parallel spaced corrugations.

2. In a turbine, the combination of a stationary member and a rotor having a sealing space therebetween, an annular packing member carried by said stationary member for sealing said space and having a bearing surface, a sealing ring engaging an edge of said packing member and designed to be forced against the packing to compress the same, a plurality of spaced screw members carried by said stationary member and engaging at intervals said sealing ring to permit any desired portion of the same to be forced against said annular packing member, a plurality of spaced fabric inserts embedded in said packing member whereby the lateral compression of said packing is converted into a uniform radial expansion of the same along the entire extent of said bearing surface, and a plurality of spaced ports in said stationary member to permit the amount of clearance at said sealing space to be visually determined, whereby the compression of said packing member may be varied around the circumference of said sealing space to close the same and compensate for wear in or displacement of said rotor and said stationary member.

In testimony whereof I have signed my name to this specification.

ELY C. HUTCHINSON.